W. BALDWIN.
GRAIN RAKE.
No. 79,720. Patented July 7, 1868.
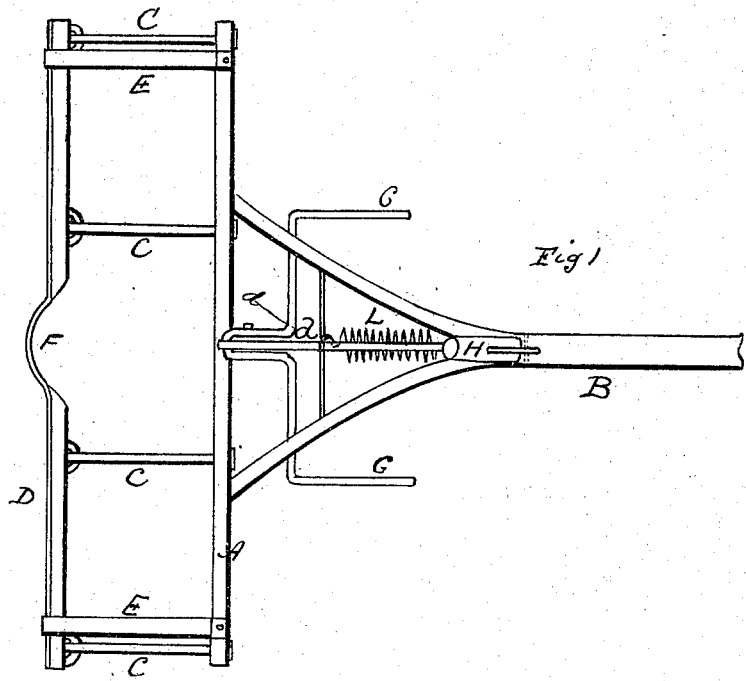
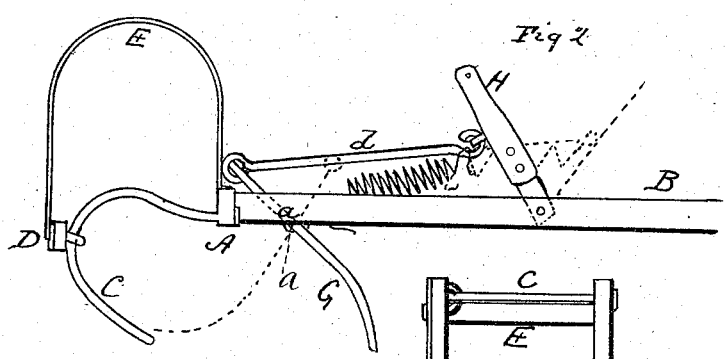
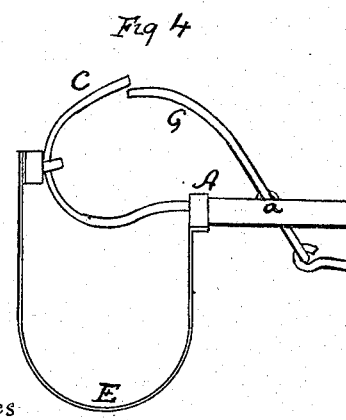
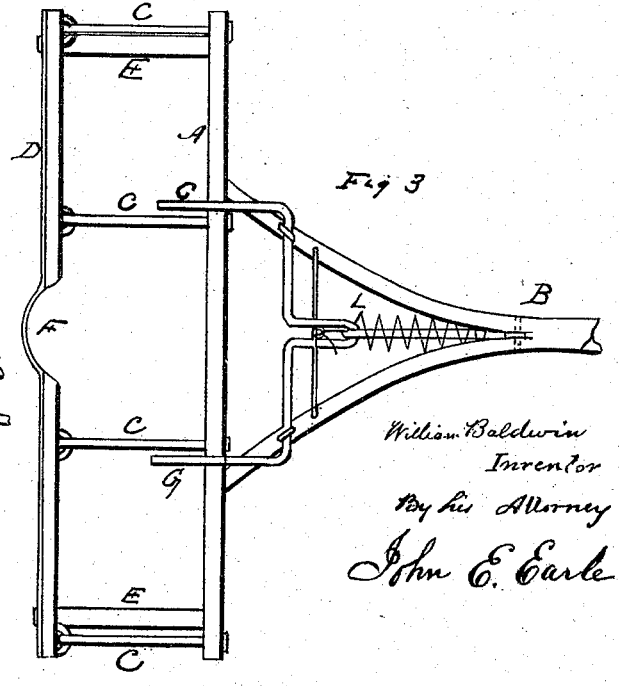
William Baldwin
Inventor
By his Attorney
John E. Earle
Witnesses
J. H. Shumway
A. S. Tibbits

United States Patent Office.

WILLIAM BALDWIN, OF PLYMOUTH, ASSIGNOR TO HIMSELF, JOEL BLAKESLEE, OF PLYMOUTH, AND E. BLAKESLEE, OF NEW HAVEN, CONNECTICUT.

Letters Patent No. 79,720, dated July 7, 1868.

IMPROVEMENT IN GRAIN-RAKES.

The Schedule referred to in these Letters Patent and making part of the same.

TO ALL WHOM IT MAY CONCERN:

Be it known that I, WILLIAM BALDWIN, of Plymouth, in the county of Litchfield, and State of Connecticut, have invented a new Improvement in Rake for Bundling Grain; and I do hereby declare the following, when taken in connection with the accompanying drawings and the letters of reference marked thereon, to be a full, clear, and exact description of the same, and which said drawings constitute part of this specification, and represent, in—

Figure 1, a top view.
Figure 2, a side view.
Figure 3, the rake inverted, as in position for tying the grain; and, in
Figure 4, a side view of the same.

This invention is designed for collecting the grain in bundles preparatory to binding, and consists in the arrangement of a series of teeth, which gather the grain, combined with a clamp, which, when the teeth have collected the requisite quantity of grain, may be pressed upon the grain so collected, to hold it securely upon the teeth, so that the rake may be inverted, and in that inverted position the grain lies in a convenient position for binding.

To enable others to construct and use my improvement, I will proceed to describe the same as illustrated in the accompanying drawings.

A is a bar, fixed to a tongue or other convenient handle, B, and in the bar A are fixed several teeth, C, of the form nearly as seen in fig. 2, and across the teeth, upon the rear, is fixed another bar, D, which tends to support the teeth, and from the bar D, over to the bar A, are arranged two or more supports, E, as seen in figs. 1 and 2. At the centre of the bar D, a recess, F, is formed in the bar, for the purpose more fully hereafter shown.

To the tongue B, forward of the bar A, I arrange two pairs of prongs or teeth, G, pivoted to the tongue at $a$, and, extending up, are attached by a connecting-rod, $b$, to a lever, H, by which said lever the prongs G may be turned back to the position denoted in red, fig. 2. A suitable spring, L, returns and holds the prongs G forward, as seen in figs. 1 and 2.

This completes the construction of the rake. Its operation is as follows:

The workman takes hold of the handle or tongue B, draws the rake along so that the teeth C pass beneath and gather the grain thereon, and when a sufficient quantity has been gathered, then the workman, taking hold of the lever H, forces the prongs G back against the grain gathered by the teeth C, as denoted in red, fig. 2. Holding the prongs in this position, the workman inverts the rake, as seen in fig. 4, and rests the rake upon the supports E, which sustain the bundle at a convenient distance from the ground; then, in that position, the band is passed around the grain, and secured in the usual manner, the space F affording a convenient passage for the band around the bundle, and when the bundle has been secured, it may be taken from the rake by releasing the prongs, or the rake may be returned to the position seen in fig. 2, and the bundle discharged upon the ground, then another bundle gathered and bound in like manner, and so on.

Having thus fully described my invention, what I claim as new and useful, and desire to secure by Letters Patent, is—

The combination of several teeth, C, and prongs G, arranged so as to gather the grain, with the supports E, extending above said teeth, the whole constructed and arranged so as to operate substantially as specified.

WILLIAM BALDWIN.

Witnesses:
W. C. GIDDINGS,
EDW'D R. IVES.